H. L. KORNAHRENS.
GASOLENE ENGINE STARTER.
APPLICATION FILED JUNE 20, 1910.
1,002,590.
Patented Sept. 5, 1911.
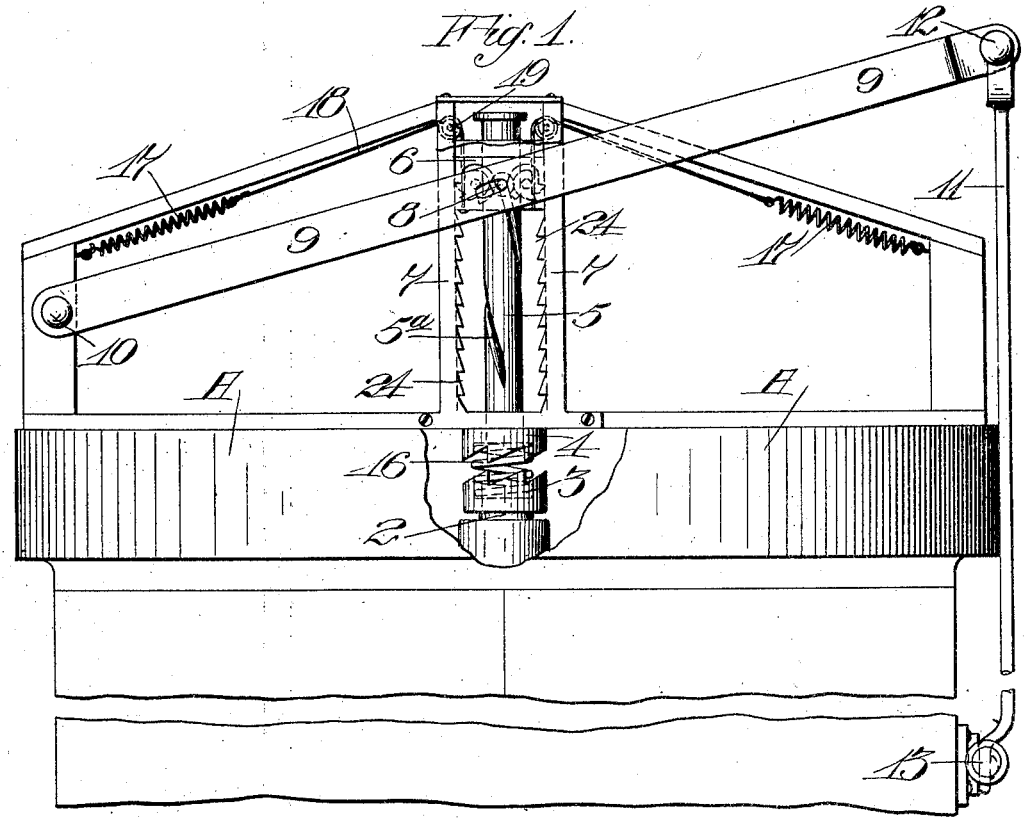
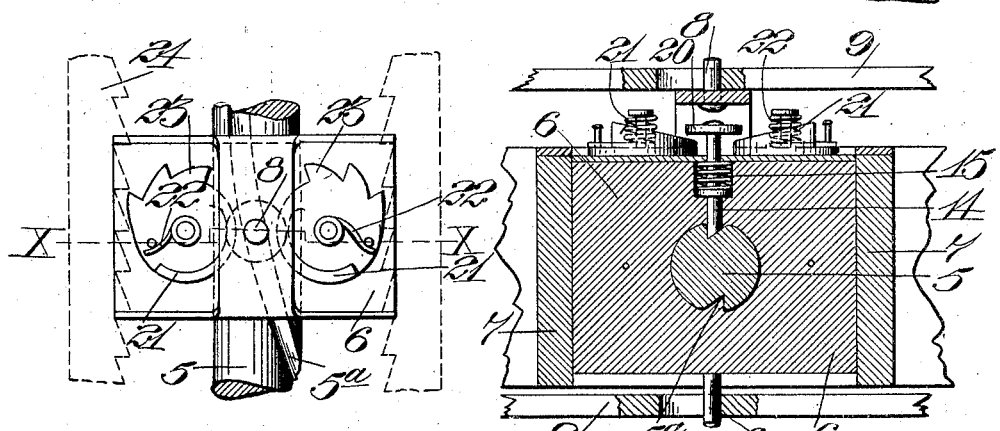
Witnesses:
J. Hastberg
F. E. Maynard
Inventor:
Henry L. Kornahrens
by G. H. Strong
his Atty

UNITED STATES PATENT OFFICE.

HENRY L. KORNAHRENS, OF OAKLAND, CALIFORNIA.

GASOLENE-ENGINE STARTER.

1,002,590. Specification of Letters Patent. Patented Sept. 5, 1911.

Application filed June 20, 1910. Serial No. 567,826.

*To all whom it may concern:*

Be it known that I, HENRY L. KORNAHRENS, citizen of the United States, residing at Oakland, in the county of Alameda and State of California, have invented new and useful Improvements in Gasolene-Engine Starters, of which the following is a specification.

My invention relates to an attachment which is especially designed for gasolene and like engines, which require a preliminary revolution or more of the crank shaft in order to start the engine.

It consists of a mechanical device, by the movement of which the preliminary rotation of the crank shaft is effected, means by which the mechanism is engaged and disengaged from the crank shaft, and means for automatically disengaging the mechanism if the engine should be accidentally reversed during the operation of starting, or while the mechanism is connected with the crank shaft.

It also comprises the combination of parts and details of construction which will be more fully explained by reference to the accompanying drawing, in which—

Figure 1 is a plan view showing my apparatus and its connection with the end of the crank shaft. Figs. 2 and 3 are details of the automatic disengaging mechanism, Fig. 2 being a plan view and Fig. 3 a section on line X X, Fig. 2.

In order to dispense with the crank which is usually employed for starting internal combustion engines such as are employed for automobile and like motors, I have designed a mechanism which may be connected with the crank shaft and given a rotary movement which will revolve the shaft one or more revolutions or parts thereof, until the engine cylinders have been charged with an explosive mixture, and the ignition of which will set the engine in motion.

As shown in the drawing, A may represent a radiator or front portion of an automobile or similar vehicle, and 2 represents the forward end of the crank shaft, through which power is applied to drive the car.

3 is a member of a clutch which is carried by the front end of the crank shaft, and 4 is the corresponding clutch member carried by a spirally grooved, turnable shaft 5, which is journaled in line with the crank shaft 2, and is movable lengthwise so as to engage or disengage with the crank shaft.

6 is a slide, movable in guides 7, which are parallel to the spirally grooved shaft 5, and are here shown as located upon opposite sides of said shaft. The slide 6 is connected by pivots 8 with a lever 9, which lever is preferably made of two parallel members suitably connected together and receiving one of the pivots 8 in each of the members, these pivots projecting from opposite sides of the slide 6. The lever 9 is fulcrumed at any suitable or desired point, as at 10, and the opposite arm or lever is so connected that it may be moved about its pivot, and thus cause the slide 6 to move from one end to the other of the space between the guides 7.

As a convenient method of operating this device so that the driver need not leave his seat, I have shown a rod or link 11 pivoted to the outer free end of the lever, as shown at 12, and the opposite end may be connected with a hand lever, or other suitable actuating device, as at 13, so that by pulling upon this hand lever the lever 9 will be correspondingly moved backwardly about its fulcrum, and the slide 6 will be moved with it.

In order to communicate motion to the shaft 5, which has the spiral grooves $5^a$ in it, a pawl 14 is slidable in suitable guides in the slide member 6, so that it may be moved radially with relation to the shaft 5. It is normally retained in contact with the shaft by a spring 15, so that the point of the pawl will drop into one of the spiral grooves $5^a$.

The operation of the device will then be as follows: When the clutch members 3 and 4 are normally separated by a spiral or equivalent spring 16, and when the lever 9 is pulled by its connection, it carries with it the slide 6, and as the pawl or pawls 14 engage a spiral groove or channel $5^a$ in the shaft, it will be seen that the shaft will be caused to revolve. At the first impulse of the pull of the lever 9, the tension of the spring 16 is overcome, and the teeth of the clutch members 3 and 4 become engaged, so that the revolution of the shaft $5^a$ will be communicated to the crank shaft 2, with the results which follow the turning of the crank shaft by hand or other means.

On the release of the actuating lever, the slide 6 will be returned to its normal position. The first movement toward this return, releases the end pressure which maintains the members 3, 4 of the clutch in engagement and the spring 16 forces them apart, thus leaving the spiral shaft 5 free to revolve independent of any movement of the engine shaft which may now be running regularly in the proper direction.

The return movement of the slide 6 may be accomplished either manually or, as here shown, by means of springs 17 connected with the slide in any suitable manner. Such a method is illustrated in the present case, where the springs are connected with the slide by flexible cords 18 passing over direction pulleys, as at 19.

If the lever which controls the electric spark-producing device for ignition of the charge is too far advanced, the first movement of the engine being very slow, the charge may be ignited in the cylinder before the crank has reached the center point, in which case a reverse or action of the engine, called a "kick" will take place. In order to provide for such a reverse movement of the engine, and prevent its doing any damage, I have shown the pawl-pin 14 having upon its upper end a disk or head 20.

21 are circular cams, turnable upon vertical pivot pins, and normally held in a certain position by springs, as at 22. These cams are turnable beneath the head 20 in such manner that when turned they will raise this head, and with it the pawl pin 14, which will thus be disengaged from the spirally grooved shaft 5.

The operation by which this is effected is as follows: The cams 21 have teeth 23 formed upon their periphery, and these teeth are adapted to engage with corresponding teeth 24, which are here shown as being carried by the guides 7. The cams 21 are held normally in a certain position by the springs 22 and in this position when the slide 6 is moved so as to rotate the shaft and start the engine, the pawl teeth 23 will move freely over the stationary rack teeth 24, during the pull upon the lever, which is designed to start the engine. If, however, the engine should be in position to start the reverse way, as previously mentioned, the tendency of the crank shaft to revolve the spiral shaft will act to move the slide 6 a short distance, and this movement causes the teeth 23 of the cams 21 to engage with the teeth 24 of the guides 7. This will cause the revolution of the cams 21, and the upper edges of these cams will engage with the head 20 of the pawl, and thus lift the pawl 14 out of engagement with the cam grooves 5ᵃ. This will allow a free backward movement of the shaft without in any way acting upon the connected mechanism or the person who may be operating it.

Having thus described my invention, what I claim and desire to secure by Letters Patent is—

1. A starting device for internal combustion engines, said device including a spirally grooved shaft contiguous to the engine crank shaft, a disengageable clutch connection between said shafts, a spring-pressed pawl adapted to engage the spiral groove and yieldable radially of the grooved shaft, and means movable lengthwise of the shaft whereby the pawl may be moved to revolve the grooved shaft.

2. A starting device for internal combustion engines, said device including a spirally grooved shaft contiguous to the engine crank shaft, a disengageable clutch connection between said shafts, a spring-pressed pawl adapted to engage the spiral groove, a slide movable lengthwise of the shaft by which the pawl is carried, said pawl being yieldable radially of the shaft, and mechanism to reciprocate the slide whereby the pawl imparts rotation to the grooved shaft.

3. A starting device for internal combustion engines, including a spirally grooved shaft contiguous to the engine crank shaft, a disengageable clutch connection between said shafts, a pawl adapted to engage the spiral grooves, a slide operable lengthwise of the grooved shaft by which the pawl is carried, mechanism to reciprocate the slide, and cams engaging the pawl to disengage the pawl from the groove.

4. A starting device for internal combustion engines, including a spirally grooved shaft contiguous to the engine crank shaft, a disengageable clutch connection between said shafts, a pawl adapted to engage the spiral grooves, a slide by which the pawl is carried, mechanism to reciprocate the slide, and means to disengage the pawl from the groove, said mechanism including revoluble cams, a head upon the pawl with which the cams may engage, and means to revolve the cams.

5. A starting device for internal combustion engines, including a spirally grooved shaft contiguous to the engine crank shaft, a disengageable clutch connection between said shafts, a pawl adapted to engage the spiral grooves, a slide by which the pawl is carried, mechanism to reciprocate the slide, means to disengage the pawl from the groove, said mechanism comprising rotatable cams adapted to engage and lift the pawl and having teeth, and rack bars with which said teeth may engage.

6. A starting device for internal combustion engines, including a spirally grooved shaft contiguous to the engine crank shaft, a disengageable clutch connection between said shafts, a pawl adapted to engage the spiral grooves, a guided slide movable parallel with the axes of the shafts and by which the pawl is carried, a fulcrumed lever with which the slide is connected, and a hand or foot lever and intermediate connection.

7. A starting device for internal combustion engines, including a spirally grooved shaft contiguous to the engine crank shaft, a disengageable clutch connection between said shafts, a pawl adapted to engage the spiral grooves, a guided slide by which the pawl is carried, rotatable cams adapted to engage and lift the pawl out of the groove, said cams having teeth, and toothed racks over which the cam teeth move without engagement in one direction and are engaged to turn the cams and release the pawl when the crank shaft turns reversely.

8. The combination with the crank shaft of an internal combustion engine, of a spirally grooved countershaft in line with the crank shaft, means to engage the shafts to turn in one direction, a lever mechanism and connections therewith slidable lengthwise of the shaft and adapted to revolve the spirally grooved countershaft, said connections including a slide having a spring-pressed pawl which is movable radially of the grooved shaft during the operation of the slide.

9. The combination with a crank shaft of an internal combustion engine, of a spirally grooved countershaft in line with the crank shaft and by means of which the crank shaft may be actuated, a disengageable connection between the two shafts, a sliding mechanism mounted on the grooved shaft and having a part to engage the groove thereof, said part being slidable radially of the countershaft, an operating lever by which the slide is actuated, and a release by means of which the two shafts may be automatically disengaged, said release comprising a device for positively withdrawing the radially movable member of the slide out of engagement with the groove of the countershaft.

In testimony whereof I have hereunto set my hand in the presence of two subscribing witnesses.

HENRY L. KORNAHRENS.

Witnesses:
G. H. STRONG,
CHARLES EDELMAN.

Copies of this patent may be obtained for five cents each, by addressing the "Commissioner of Patents, Washington, D. C."